US010199922B2

(12) United States Patent
Alvarez Valenzuela et al.

(10) Patent No.: US 10,199,922 B2
(45) Date of Patent: Feb. 5, 2019

(54) SUB-MODULE OF A MODULAR BRAKING UNIT, BRAKING UNIT, AND METHOD FOR OPERATING THE BRAKING UNIT (71) Applicant: SIEMENS AKTIENGESELLSCHAFT, Munich (DE)

(72) Inventors: Rodrigo Alonso Alvarez Valenzuela, Nuremberg (DE); Dominik Schuster, Diespeck (DE); Klaus Wuerflinger, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 15/323,328

(22) PCT Filed: Jul. 1, 2014

(86) PCT No.: PCT/EP2014/063925
§ 371 (c)(1),
(2) Date: Dec. 30, 2016

(87) PCT Pub. No.: WO2016/000757
PCT Pub. Date: Jan. 7, 2016

(65) Prior Publication Data
US 2017/0133924 A1 May 11, 2017

(51) Int. Cl.
*H02M 1/32* (2007.01)
*H02M 7/5395* (2006.01)
(Continued)

(52) U.S. Cl.
CPC ........... *H02M 1/32* (2013.01); *H02M 7/5395* (2013.01); *H02M 2001/0009* (2013.01); *H02M 2001/325* (2013.01); *H02M 2007/4835* (2013.01)

(58) Field of Classification Search
CPC .... H02M 3/15; H02M 3/156; H02M 7/53871; H02M 1/32; H02M 7/7575;
(Continued)

(56) References Cited

U.S. PATENT DOCUMENTS 4,427,928 A * 1/1984 Kuriyama ................ H02P 3/14
318/139
8,610,384 B2 12/2013 Dommaschk et al.
(Continued)

FOREIGN PATENT DOCUMENTS

CN 102957378 A 3/2013
DE 102008045247 A1 3/2010
(Continued)

OTHER PUBLICATIONS

Hussennether V. et al: "Projects BorWin2 and HelWin1—Large Scale Multilevel Voltage-Sourced Converter Technology for Bundling of Offshore Windpower",CIGRE 2012 B4-306, pp. 1-11, found on the Internet (Jul. 3, 2016) URL:http://www.ptd.siemens.de/B4_306_2012v2_He1Win1 _BorWin2. pdf, XP055489887.
(Continued)

*Primary Examiner* — Adolf Berhane
(74) *Attorney, Agent, or Firm* — Laurence Greenberg; Werner Stemer; Ralph Locher (57) ABSTRACT

A sub-module of a modular braking unit that is connected to a DC transmission network. Each sub-module has an inverse diode, and a storage capacitor connected in parallel with the inverse diode via a free-wheeling diode. An energy-consuming switching unit is connected to the storage capacitor. In order to provide a sub-module of this type such that the braking unit can function with relatively low losses in the stand-by and idle state, the sub-module is provided with an actively switchable semiconductor bypass path in parallel with the inverse diode. A braking unit has a plurality of series-connected sub-modules and we disclose a method for operating a braking unit of this type.

13 Claims, 4 Drawing Sheets (51) Int. Cl.
  *H02M 7/483* (2007.01)
  *H02M 1/00* (2006.01)
(58) Field of Classification Search
  CPC ............... H02M 3/33507; H02M 7/1557;
       H02H 7/268; H02H 7/122; G05F 1/565;
       G05F 1/567; G05F 1/569; G05F 1/578
  USPC ........ 363/35, 55, 56.01, 74, 78, 79, 80, 131;
                                  323/275, 276, 285
  See application file for complete search history.

(56) References Cited

U.S. PATENT DOCUMENTS

| | | | |
|---|---|---|---|
| 8,879,292 B2 | 11/2014 | Jakob et al. | |
| 2008/0232145 A1* | 9/2008 | Hiller | H02H 7/1225 363/56.01 |
| 2015/0295403 A1* | 10/2015 | Lewis, III | H02J 1/00 307/26 |

FOREIGN PATENT DOCUMENTS

| | | |
|---|---|---|
| DE | 102012220388 A1 | 5/2014 |
| EP | 2596980 A2 | 5/2013 |

OTHER PUBLICATIONS

Dorn J: "Trans Bay Cable—A Breakthrough of VSC Multilevel Converters in HVDC Transmission", CIGRE 2012 San Francisco Colloquium, pp. 1-6, XP055489BB1, found on the Internet (Jul. 3, 2018) URL:http://www.ptd.sIemens.de/TransBayCable_HVDC_PLUS_Paper.pdf.

* cited by examiner

SUB-MODULE OF A MODULAR BRAKING UNIT, BRAKING UNIT, AND METHOD FOR OPERATING THE BRAKING UNIT

BACKGROUND OF THE INVENTION

Field of the Invention

The invention relates to a sub-module of a modular braking unit and a braking unit that is connected to a DC transmission network, wherein each sub-module comprises an inverse diode and a storage capacitor, which is arranged in parallel to said inverse diode by way of a free-wheel diode, and also an energy-consuming switching unit that is connected to the storage capacitor.

Figure 1:
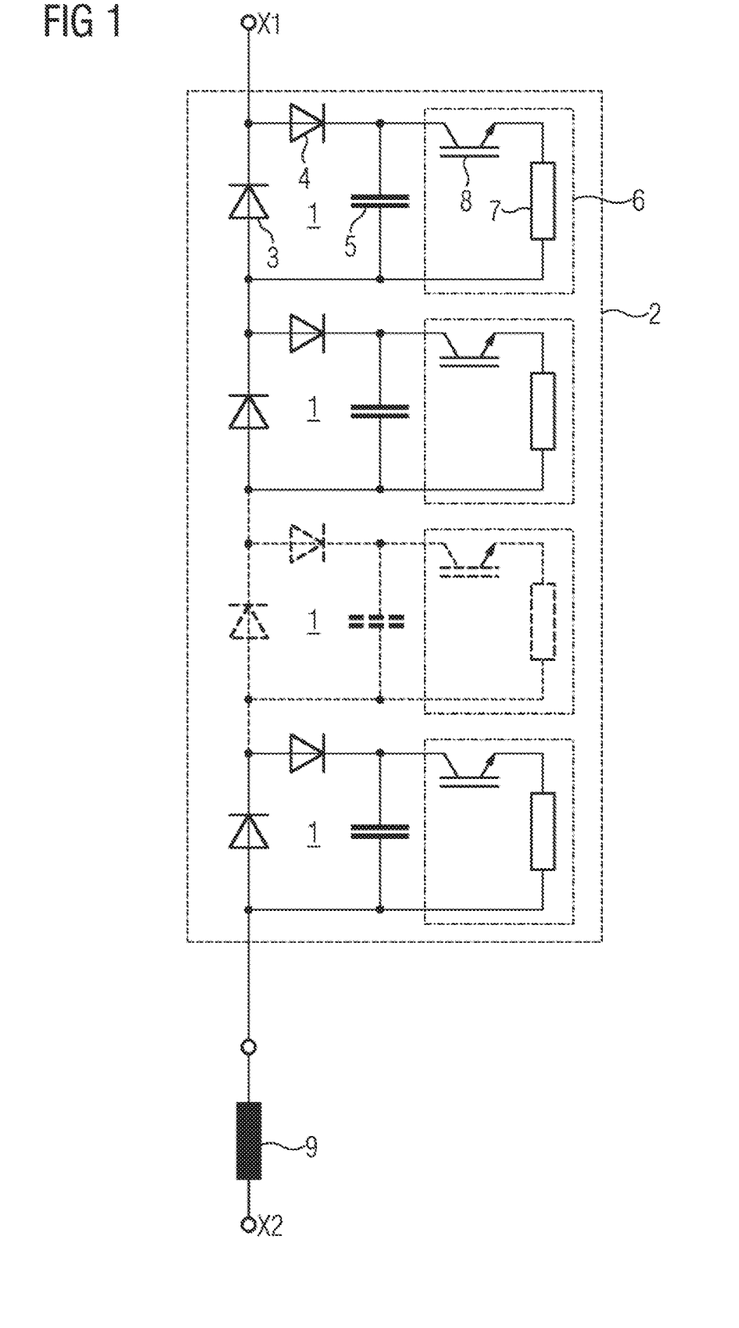
FIG. 1 illustrates a known braking unit

Such a sub-module is frequently used in a known braking unit, as is illustrated in FIG. 1. Each sub-module 1 of the known braking unit 2 comprises in each case an inverse diode 3 and a free-wheel diode 4 by way of which a storage capacitor 5 is charged. An energy-consuming switching unit 6 that can be controlled independently is connected to the storage capacitor 5; the energy-consuming switching units 6 of the braking unit 2 can therefore be controlled in each case individually. The energy-consuming switching unit 6 comprises an energy-consuming element, for example an ohmic resistor 7 that is connected by way of semi-conductor power switching element 8 to the storage capacitor 5. In the case of this known braking unit, the energy-consuming switching units 6 are therefore integrated in the braking unit. The known braking unit 2 comprises on the one hand an external connection X1 and on the other hand a further external connection X2 that is connected by way of a concentrated or distributed inductance 9 to the series connection of the sub-modules 1.

The storage capacitors 6 are embodied relatively large so that the respective semi-conductor power switching elements 8 can be controlled in a time off-set manner. The technical demand placed on achieving this and the switching behavior is consequently comparatively small since it is not necessary to provide a hard series connection of the sub-module 1. In order to achieve a controllable current flow through the braking unit and consequently to achieve an energy conversion, the individual semi-conductor power switching elements 8 are controlled by way of the method that is usual in MMC (modular multilevel convertor) technology. These methods can use sorting algorithms or a dedicated pulse width modulation for each sub-module, both of which have the control objective of keeping all capacitor voltages almost equal.

Such a known braking unit is used by way of example in the case of a DC transmission network that is connected to an inverter in order to be able the discharge the full power output of the DC transmission network for a few seconds in the event of a fault occurring on the AC-side in the inverter. During this time period, it is possible to detect an AC-side fault and to bring the inverter back into operation without adversely affecting the rectifier, which is feeding into the DC transmission networks, and the AC networks that is being supplied thereby.

BRIEF SUMMARY OF THE INVENTION

In order to embody the sub-module of a braking unit of the type mentioned in the introduction in such a manner that in the waiting/idle state the braking unit has relatively small power losses, an actively switchable semi-conductor bypass path is provided in accordance with the invention parallel to the inverse diode in the case of the sub-module.

An essential advantage of the sub-module in accordance with the invention resides in the fact that as a result of an actively switchable semi-conductor bypass path a braking unit that is equipped with such a sub-module can be operated as a boost converter with regard to the sum of voltages of its storage capacitors. The storage capacitor of the sub-module in accordance with the invention is therefore a true, controllable energy storage device so that the sum of the voltages at the storage capacitors of the sub-modules of a braking unit can be greater than the voltage that is prevailing at the external connections of the braking unit. A further advantage resides in the fact that the energy-consuming switching unit can be designed to a great extent independently from the voltage at the external connections of the braking unit so that the resistance value of the actively switchable semi-conductor bypass path can be configured on the one hand in an improved manner and on the other hand independently from the prevailing voltage with the characteristics of the semi-conductor switch that is connected thereto. This additionally provides the advantage that the inverse diode of the sub-module in accordance with the invention can be designed for smaller currents.

The sub-module in accordance with the invention can be embodied in different ways with respect to the semi-conductor bypass path; it is regarded as being particularly advantageous if this semi-conductor bypass path comprises a semi-conductor power switch. It is preferred that this semi-conductor power switch is a bipolar transistor having an insulated gate electrode (IGBT).

The sub-module can also be embodied in different ways with respect to the energy-consuming switching unit. In the case of an advantageous embodiment, the energy-consuming switching unit is an ohmic resistor that is arranged in parallel with the storage capacitor by way of a power semi-conductor switching element. This provides the advantage that better use can be made of the semi-conductor power switch and the semi-conductor power switching element of each sub-module: in addition it provides the opportunity that only a few sub-modules are required when connecting the sub-module to a braking unit, which advantageously results in a cost reduction and in the braking unit requiring less installation space.

However, it can also be advantageous if the energy-consuming switching unit is a non-linear resistor that is arranged directly in parallel with the capacitor; the energy-consuming switching unit is therefore embodied in this case in a purely passive manner. The semi-conductor power switching element is therefore omitted in this case, which has an advantageous effect with respect to the costs and the installation space required for the individual sub-module and consequently also for a braking unit that is constructed from such sub-modules.

In the case of this embodiment of the sub-module in accordance with the invention, the non-linear resistors in the sub-modules can be effectively switched or switched on by way of correspondingly controlling the semi-conductor power switches in the semi-conductor bypass path in conjunction with the sub-modules merely by way of raising or lowering the voltage at the storage capacitor. The advantage is also produced in the case of this embodiment of the sub-module in accordance with the invention that the semi-conductor power switches and the semi-conductor power switching elements can be designed in an improved manner and consequently the number of sub-modules required can be reduced.

It has proven to be particularly advantageous if the energy-consuming switching element in the form of a non-linear resistor is an overvoltage arrestor. In the case of a braking unit that is embodied with such sub-modules, it is possible to increase the converted power the greater the number of sub-modules averaged over time are adjusted to a capacitor voltage at which the non-linear resistor or overvoltage arrestor is conductive.

In order to obtain a braking unit that has a relatively small power loss, a braking unit is provided in accordance with the invention that is connected to a DC transmission system and is constructed in accordance with the invention from multiple sub-modules that are arranged in series, such as are described above in detail.

Such a braking unit is inter alia advantageous insofar as it can comprise as a minimal resistance the sum of all resistors of the energy-consuming switching units. In this case, all these switching elements are switched on when using sub-modules that comprise energy-consuming switching units having in each case a semi-conductor power switching element. The smallest resistance of the braking unit in accordance with the invention is zero if all semi-conductor power switches in the semi-conductor bypass path are switched on. It is thus possible in an advantageous manner to build up the current flowing through the braking unit in a comparatively quick manner.

The same applies for the case that a current flowing through the braking unit is to be reduced rapidly. In this case, the voltage at the storage capacitors can be kept stationary considerably greater than the DC voltage at the external connections of the braking unit. It is possible at any time to build up a high counter-voltage and to rapidly commutate downwards the current flowing through the braking unit.

In the case of a particularly advantageous embodiment of the braking unit in accordance with the invention, an additional energy-consuming switching unit is provided arranged in series with the sub-modules that are arranged in series. In this case, each sub-module is to be dimensioned in a relatively simple manner because the voltage at the braking unit in accordance with the invention can be adjusted over a wide range. This additional energy-consuming switching unit, by way of example a resistor arrangement, can be used in addition. As a result of being able to adjust the voltage at the braking unit in an almost continuous manner, said unit is exposed to relatively low pulsed loads. The additional energy-consuming resistor arrangement can therefore be achieved in a comparatively advantageous manner. Furthermore, the costs can be further reduced because the additional energy-consuming resistor arrangement is more cost effective with regard to its power output than the resistors or overvoltage arrestors of the sub-modules. This additional energy-consuming resistor arrangement can be placed advantageously outside a converter housing that houses the braking unit, as a consequence of which the convertor housing and its cooling systems can be constructed with smaller dimensions.

A further advantage of the braking unit in accordance with the invention resides in the fact that in the stationary and also blocked state it can be symmetrically balanced in a very advantageous manner since the transverse current flowing through the braking unit does not have to flow through all the resistors of the sub-modules of the braking unit. As a consequence, the braking unit loses less power when idling. The resistors of the energy-consuming switching units are moreover not pre-heated as a result of symmetrically balancing the braking unit and as a result can absorb more energy than in the case of the known braking unit described in the introduction.

In the case of a particularly advantageous embodiment of the braking unit in accordance with the invention, a measuring device for the current flowing through the sub-modules of the braking unit that are arranged in series and measuring devices for the voltages at the sub-modules are connected to a control arrangement that is suitable in the event of a fault occurring in the inverter to output control signals to the power semi-conductor switches of the sub-modules so as to adjust the voltages at the sub-modules according to an optimization criterion. This occurs in the case of a braking unit that is connected to an inverter if a fault has occurred on the AC side in an inverter that is connected to the braking unit in accordance with the invention.

The above described embodiment of the braking unit in accordance with the invention is therefore above all advantageous because with said braking unit the total losses in the sub-modules and consequently the total loss of the braking unit is comparatively small and its maximal power output is relatively high. This is due to the fact that the temperature of the respective hottest semi-conductor power switches is reduced and it is thus possible to increase the maximal power output of the respective sub-module and consequently of the entire braking unit. During an optimal adjustment of the voltage at the sub-modules or of the voltage at the storage capacitors, the maximal power output of the braking unit can be increased by up to 20% with respect to an embodiment that does not have the facility for the optimal adjustment of the sub-module voltage.

Moreover, the invention relates to a method for operating a braking unit of the above described embodiment in accordance with the invention in the event of a fault in an inverter that is connected to the DC transmission network, wherein the object of said invention is to design this method so that the total losses in the sub-modules and consequently the total loss of the braking unit are comparatively small and the maximal power output relatively high.

In order to achieve this object, the current flowing through the sub-modules that are arranged in series and the voltages at the individual sub-modules are determined in accordance with the invention and the ascertained values for the current and the voltages at the sub-modules are used to establish a prevailing working point of the respective sub-module; with respect to at least one predetermined optimization criterion for the braking unit, the voltages at the sub-modules are adjusted according to the optimization criterion with reference to the respective prevailing working point by means of switching the actively switchable semi-conductor bypass path or the energy-consuming switching unit. It goes without saying that it is necessary in so doing for the energy-consuming switching unit to be switchable in each case, in other words to comprise an ohmic resistor that can be switched by way of a power semi-conductor switching element in parallel with the respective storage capacitor.

An essential advantage of the method in accordance with the invention is regarded to be that the temperature of the respective hottest semi-conductor power switch is reduced and thus the power output of the respective sub-module and consequently the power output of the entire braking unit can be increased. In the case of an optimal adjustment of the sub-module voltage, the maximal power output of the braking unit can be increased by up to 20%.

Different optimization criteria can be used in the case of the method in accordance with the invention; it thus appears advantageous in the case of an optimization criterion that takes into consideration the temperature behavior of the semi-conductor power switches, the semi-conductor power switching elements, the inverse diode and also of the freewheel diode as semi-conductor components of the sub-modules with reference to the respective working point of the semi-conductor components for different voltages to calculate the switching and conductive losses of the semi-conductor components of the respective sub-modules and to determine the temperature increases in the semi-conductor components and also the temperatures of the semi-conductor components in the event of a fault in dependence upon the duration of the fault; subsequently the temperature difference with respect to the maximal admissible depletion layer temperature of the respective semi-conductor component is determined for the respective working point of each semi-conductor component of the sub-modules in the case of the possible voltages at the sub-modules, and optimal voltages are set at the sub-modules using the objective function.

It is possible in so doing as the objective function in an advantageous manner in the case of an optimization criterion that takes into consideration the temperature behavior of the semi-conductor components of the sub-modules with reference to the respective working point of the semi-conductor components for different voltages to calculate switching and conductive losses of the semi-conductor components of the respective sub-modules and determine temperature increases in the semi-conductor components and also the temperatures of the semi-conductor components in the event of a fault in dependence upon the duration of the fault; the temperature difference with respect to the maximal admissible depletion layer temperature of the respective semi-conductor component is determined for the respective working point of each semi-conductor component of the sub-modules in the case of the possible voltages at the sub-modules, and optimal voltages are set at the sub-modules using an objective function.

It is possible in so doing, irrespectively of the type of optimization criterion, to determine the temperature increases in the semi-conductor components and also the temperature of the semi-conductor components using a thermal model.

As a further optimization criterion, it is possible in an advantageous manner to determine the temperature increases in the semi-conductor components and also the temperatures of the semi-conductor components in the event of a fault using a thermal model.

It is also possible to use as optimization criteria additionally or alternatively a minimal ripple of the voltages at the sub-modules, an identical mean temperature of the semi-conductor components or a mixture of the two optimization criteria. Also other optimization criteria can be used in the case of the method in accordance with the invention.

For the purposes of further explaining the invention:

DESCRIPTION OF THE INVENTION

Figure 2:
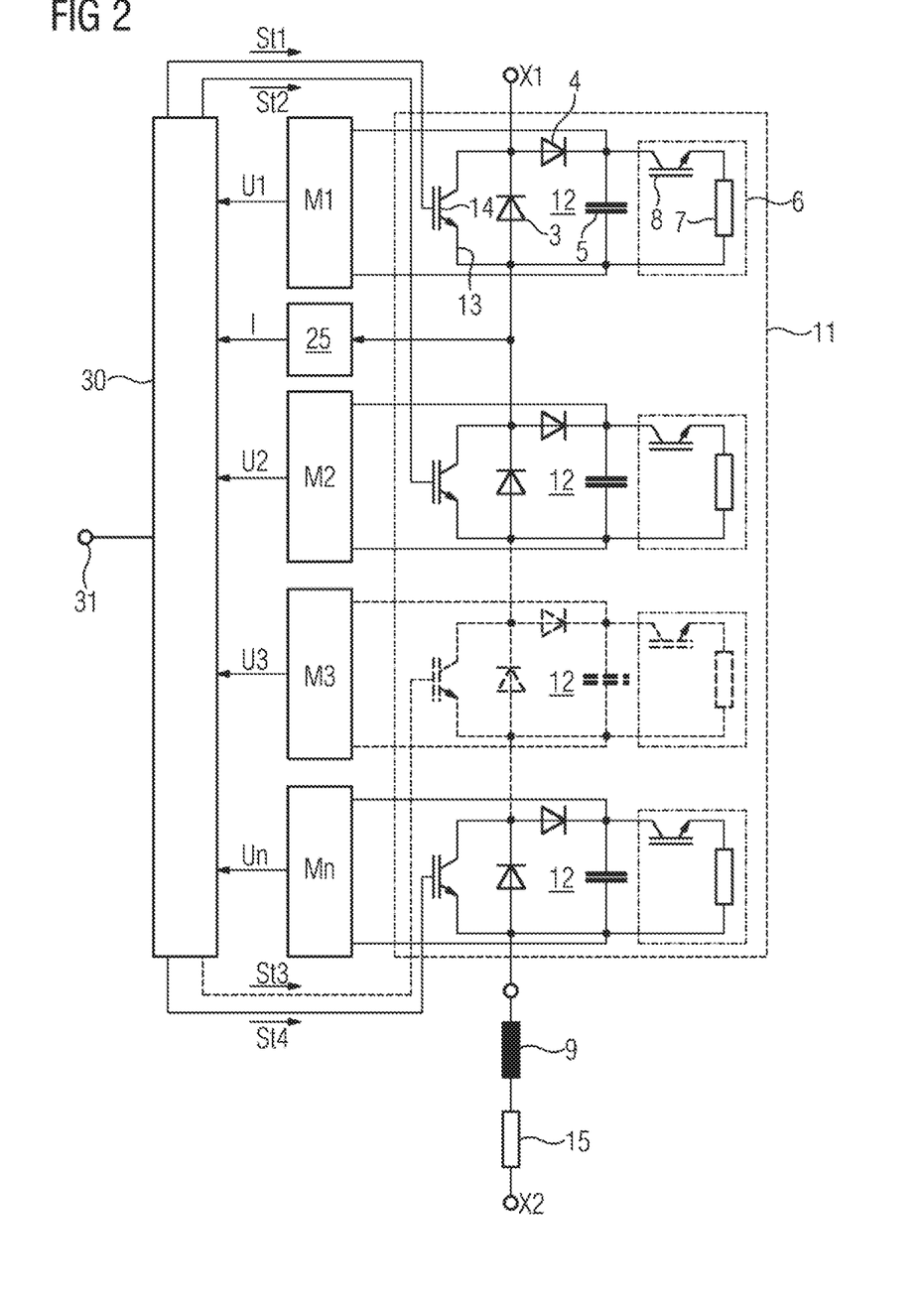
FIG. 2 illustrates an exemplary embodiment of a braking unit in accordance with the invention.

FIG. 2 in which those components that correspond with the braking unit as shown in FIG. 1 are provided with like reference numerals illustrates a braking unit 11 having multiple sub-modules 12 that comprise in each case an inverse diode 3. An actively switchable semi-conductor bypass path 13 extends in parallel with the inverse diode 3 and is formed in the present case by a semi-conductor power switch 14.

As in the case of the above mentioned prior art, a storage capacitor 5 is connected to each sub-module 12 by way of a free-wheel diode 4 and said storage capacitor lies parallel with an energy-consuming switching unit 6. The energy-switching unit 6 also comprises in this case a series connection of a semi-conductor power switching element 8 and an energy-consuming element, for example an ohmic resistor 7.

As is further illustrated in FIG. 2, the braking unit 11 comprises in the conventional manner an inductance 9 and an additional energy-consuming resistor arrangement 15 whose one connection forms an external connection X2 of the braking unit 11.

Figure 3:
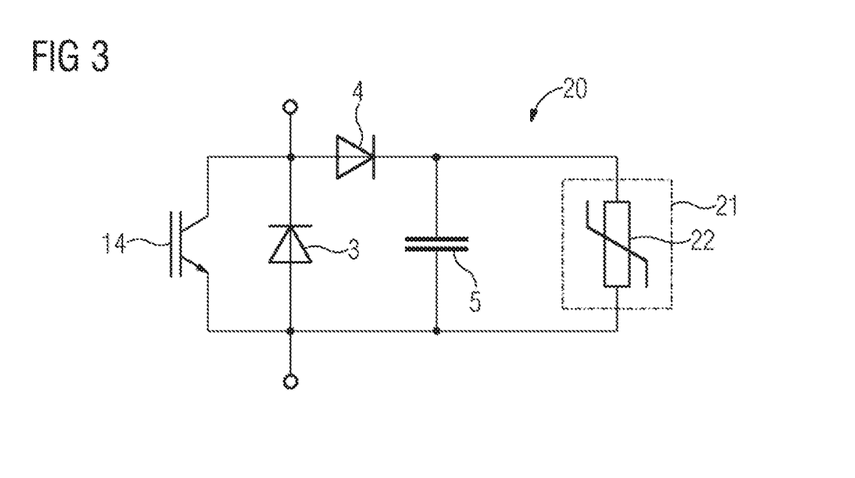
FIG. 3 illustrates a further embodiment of a sub-module for the braking unit in accordance with the invention.

FIG. 3 illustrates a sub-module 20 that is modified with respect to the sub-modules 12 used in the braking unit 11 illustrated in FIG. 2 insofar as an energy-consuming switching unit 21 that us also arranged in this case parallel with the storage capacitor 5 comprises a non-linear resistor 22 or an overvoltage arrestor, in other words it can only be passively switched.

FIG. 2 further illustrates that in the case of the braking unit 11 the current flowing through the sub-modules 12 that are arranged in series is determined using a measuring device 25 and the voltages at the individual sub-modules 12 or at the storage capacitors 5 are determined with the aid of measuring devices M1 to Mn. The values I for the current and the values U1 to Un for the voltages at the storage capacitors 5 ascertained in this manner are processed in a control arrangement 30. This control arrangement is activated by way of a connection 31 if by way of example a fault occurs on the AC side in an inverter that is connected to the braking unit 11. In this case, a prevailing working point of the respective sub-module 12 is established. As is further described hereinunder, different optimization criteria can be used for the braking unit 11 in order to adjust the voltages at the sub-modules 12 by means of switching the actively switchable semi-conductor bypass 13 with reference to the respective prevailing working point.

This adjustment can be performed in the following manner: the first step is to determine the working point with reference to the measurement of the current flowing through the braking unit 11 whilst obtaining the measurement variable I and the measurement of the voltages at the sub-modules 12 whilst obtaining the values U1 to Un. Furthermore, the duration of the working point is determined with reference to an on-line or off-line calculation of the respective temperatures to be expected for the semi-conductor components (semi-conductor power switches 14, semi-conductor power switching element 8, inverse diode 3 and free-wheel diode 4) after a fault that lasts x seconds. On the basis thereof, the optimal desired values are calculated for the voltages at the sub-modules 12 of the braking unit 11 and also the extent of control of the semi-conductor power switch 14 and the semi-conductor power switch element 8 with reference to the objective function and corresponding control signals St1 to Stn are output by the control arrangement to the semi-conductor power switches 14.

In the case of off-line calculations, a table is produced showing the different temperatures ($T_{j,\ HLj}$ where j=1 . . . 4) of the semi-conductor components 3, 4, 8 and 14 of the sub-modules 12 after a fault that lasts x seconds in an inverter, which is connected to the braking unit 11 and not figuratively illustrated, in the case of different voltages at the sub-modules 12 for each working point and also for the design of a sub-module that is selected in each case as a standard of comparison.

With reference to the prevailing working point, the temperature delta with respect to the maximal admissible depletion layer temperature ($\Delta T_{j,HLj}$) of each semi-conductor component j=3, 4, 8 and 14 of the sub-modules 12 for each possible voltage at the sub-modules 12 of the braking unit 11 is calculated:

$$(\Delta T_{j,HLj}) = T_{jmax} - T_{j,HLj} \text{ where } j=1 \ldots 4 \quad (1)$$

A possible objective function (ZF) is the maximization of this temperature delta with respect to the maximal admissible depletion layer temperature of the hottest semi-conductor component:

$$ZF = \max(\min(\Delta T_{j,HLj} \text{ where } j=1 \ldots 4)) \quad (2)$$

In the case of on-line calculations, the switching and conductive losses of the semi-conductor components 3, 4, 8 and 14 of the sub-modules 12 are calculated with reference to the working point for different voltages at the sub-modules 12 of the braking unit 11. With reference to a simplified thermal model (for example only one thermal RC member) the temperature increases and also the temperatures ($T_{j,HLj}$ where j=1 . . . 14) of the semi-conductor components 3, 4, 8 and 14 are calculated after a fault that lasts x seconds in the inverter. With reference to the prevailing working point, the temperature delta with respect to the maximal admissible depletion layer temperature ($\Delta T_{j,HLj}$) of each semi-conductor component 3, 4, 8 and 14 is calculated for each possible voltage at the sub-modules 12 of the braking unit 11 and subsequently the optimal voltages of the sub-modules 12 are selected with reference to an objective function.

Figure 5:
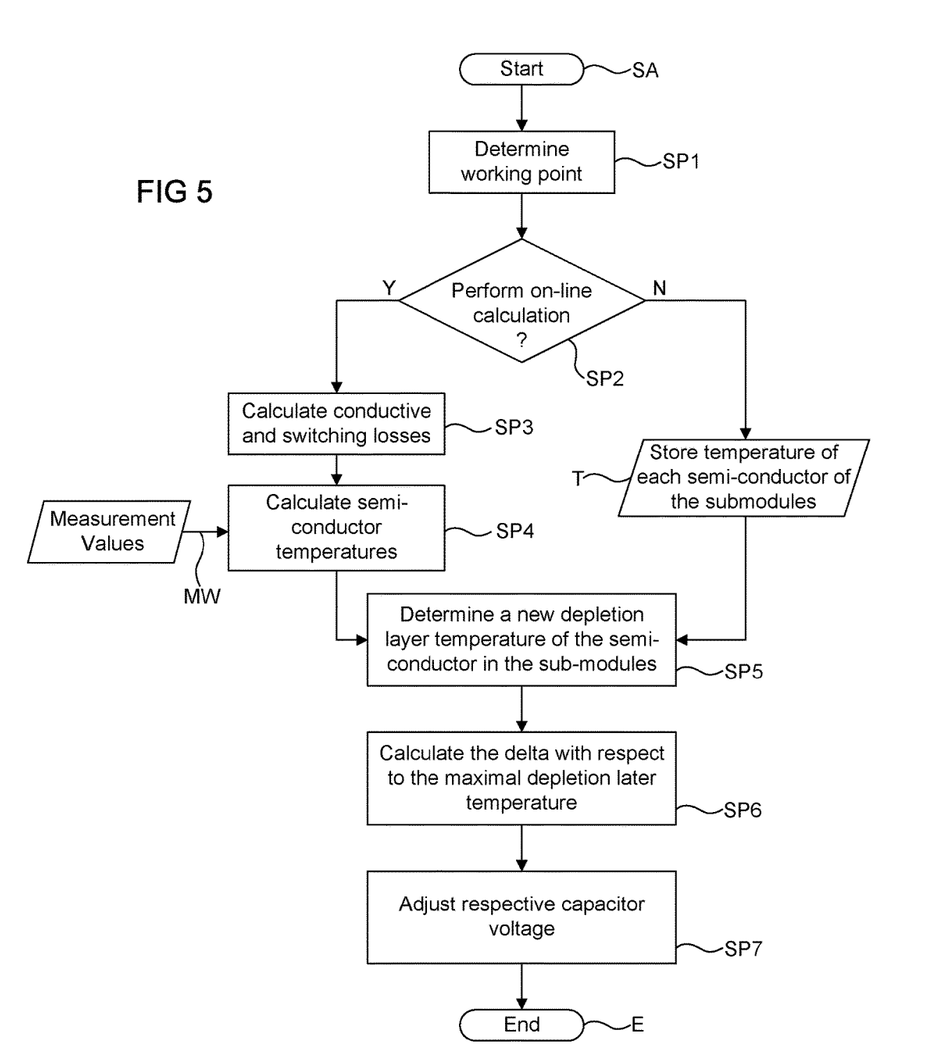
FIG. 5 illustrates a simplified flow diagram of an algorithm for varying the capacitor voltages with reference to optimization criteria.

One possible objective function (ZF) is in this case the maximization of the temperature delta with respect to the maximal admissible depletion layer temperature of the hottest semi-conductor component 3, 4, 8 or 14. The flow diagram illustrated in FIG. 5 illustrates the progression of such a process. In the case of the illustrated process, after a start SA in a step Sp1 the working point is determined with reference to the currently required braking power with reference to the values I for the current and the voltages at the storage capacitors U1 to Un.

Subsequently, a decision is made in a step Sp2 as to whether an on-line calculation is to be performed or not. In the case of a positive decision y, the conductive and switching losses for different capacitor voltages are subsequently calculated in a further step Sp3. The semi-conductor temperatures $T_{j,HLj}$ where j=1 . . . 14 are calculated subsequently in a step Sp4 using a simplified thermal model, wherein the measured capacitor voltages U1 to Un and the semi-conductor temperatures are taken into consideration.

In a subsequent step Sp5, a new depletion layer temperature of the semi-conductor in the sub-modules 1 is determined.

In the case of a negative decision n in step Sp2, the method branches to a table T in which the temperature of each semi-conductor of the sub-modules 1 is stored following a fault that lasts x seconds for each working point in the case of different capacitor voltages U1 to Un; in so doing the respective design of the sub-modules is adjusted. In this manner, it is also possible in this case to determine a new depletion layer temperature in the step Sp5.

Subsequently, the delta with respect to the maximal depletion layer temperature of each individual semi-conductor is calculated in a further step SP6 and subsequent thereto the respective capacitor voltage is adjusted in a step SP7 with reference to optimization criteria, for example in accordance with the above mentioned equation (2). E represents the end of the maximization of the temperature delta.

Naturally, other optimization criteria are also feasible for the off-line calculation or the on-line calculation, such as for example minimal voltage ripple of the voltage at the sub-modules 12 or rather the storage capacitor 5, identical mean temperature of the semi-conductor components 3, 4, 8 and 14, or weighted mixtures of criteria that can be described with reference to the objective function.

Figure 4:
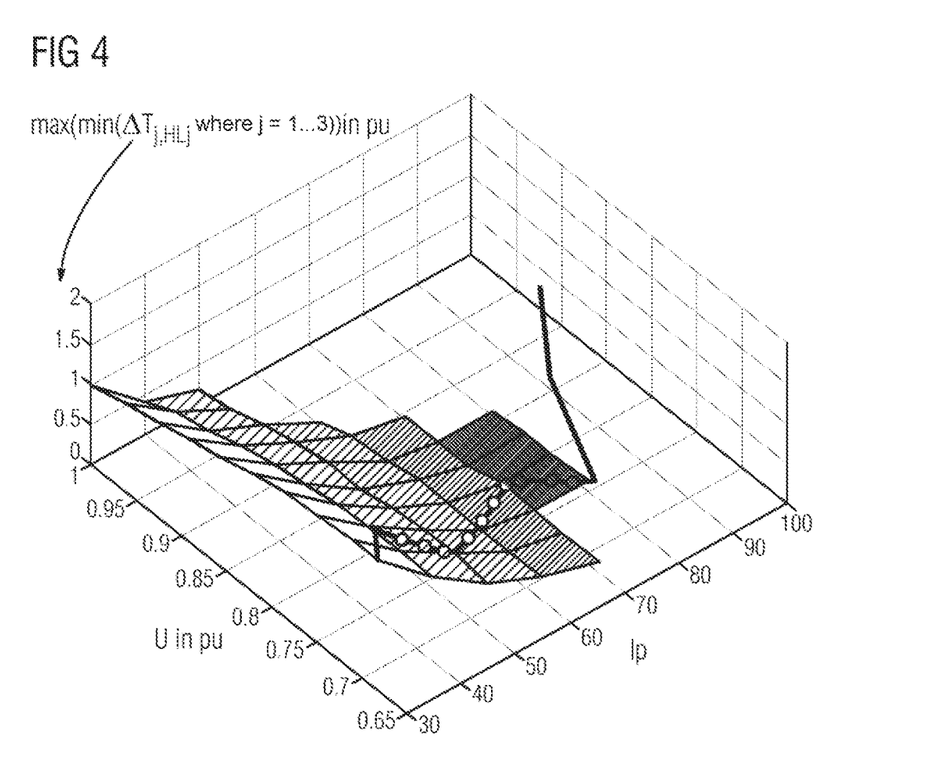
FIG. 4 illustrates an example of a 3D graph with a minimal temperature delta with respect to maximal admissible depletion layer temperature ($T_{j,\,HLj}$ where j=1 ... 4) of the sub-modules after a loading that lasts 2 hours in the case of an optimization criterion that takes into consideration a temperature behavior.

FIG. 4 illustrates an exemplary 3D graph showing the minimal temperature delta with respect to the maximal admissible depletion layer temperature ($T_{j,\ HLj}$ where j=1 . . . 4) of the sub-modules 12 after a fault that lasts 2 seconds in the inverter in the case of different voltages at the sub-modules 12 of the braking unit 11. The illustrated area describes the maximization of the minimal delta with respect to the maximum permissible depletion layer temperature for the hottest component for different voltages U of the sub-module 12 and also the different currents Ip that are the maximal admissible for the semi-conductor components; in so doing a current is identified as a percentage of the nominal value by Ip. The broken line in FIG. 4 illustrates the optimal selection of the voltages of the sub-modules 12 for the braking unit 11. It is to be noted that when using fixed sub-module voltages a maximum of only 80% of the possible current—or rather of the possible power output—can be used.

The invention claimed is:

1. A method for operating a braking unit in the event of a fault in an inverter that is connected to a DC transmission system;
    providing a braking unit connected to the DC transmission system, the braking unit having a plurality of sub-modules connected in series with one another and each of the sub-modules including an inverse diode, a storage capacitor connected in parallel with the inverse diode by way of a free-wheel diode, an energy-consuming switching unit connected to the storage capacitor, and an actively switchable semiconductor bypass path connected in parallel with the inverse diode;
    determining a current flowing through the series-connected sub-modules and voltages at individual sub-modules;
    establishing a prevailing working point of the respective sub-module from the ascertained values for the current and the voltages at the sub-modules; and
    with respect to at least one predetermined optimization criterion for the braking unit adjusting the voltages at the sub-modules with reference to the respective prevailing working point by switching the actively switchable semiconductor bypass path or the energy-consuming switching unit corresponding to the at least one optimization criterion.

2. The method according to claim 1, which comprises:
providing an optimization criterion that takes into consideration a temperature behavior of the power semiconductor switches, of the inverse diode and also of the free-wheel diode as semiconductor components of the sub-modules with reference to the respective working point of the semiconductor components for different voltages;
calculating switching losses and conductive losses of the semiconductor components of the respective sub-modules;
determining temperature increases of the semiconductor components and also the temperatures of the semiconductor components in the event of the fault in dependence upon the duration of the fault;
determining, for the respective working point of each semiconductor component of the sub-modules, a temperature difference with respect to a maximal admissible depletion layer temperature of the respective semiconductor component in the case of the possible voltages at the sub-modules; and
adjusting optimal voltages at the sub-modules using an objective function.

3. The method according to claim 2, which comprises defining as the objective function a maximization of a temperature difference between the depletion layer temperature of a hottest semiconductor component in a sub-module and the maximal admissible depletion layer temperature of the hottest semiconductor component.

4. The method according to claim 2, which comprises, in the event of the fault, using a thermal model for determining temperature increases of the semiconductor components and also the temperatures of the semiconductor components.

5. The method according to claim 1, wherein the optimization criterion is a minimal ripple in the voltages at the sub-modules, an identical mean temperature of the semiconductor components, a mixture of the two, or a mixture of other optimization criteria.

6. A braking unit connected to a DC transmission system, said braking unit comprising:
a plurality of sub-modules connected in series with one another, each of said sub-modules including:
an inverse diode;
a storage capacitor connected in parallel with said inverse diode by way of a free-wheel diode;
an energy-consuming switching unit connected to said storage capacitor; and
an actively switchable semiconductor bypass path connected in parallel with said inverse diode;
a current measuring device for measuring a current flowing through said series-connected plurality of sub-modules;
a plurality of voltage measuring devices for measuring voltages at said sub-modules; and
a control unit connected to said current measuring device and said voltage measuring devices and configured for outputting control signals to said power semiconductor switches of said sub-modules for adjusting the voltages at said sub-modules in accordance with an optimization criterion.

7. The braking unit according to claim 6, which further comprises an additional energy-consuming switching unit connected in series with said series-connected plurality of sub-modules.

8. The braking unit according to claim 6, wherein said semiconductor bypass path comprises a power semiconductor switch.

9. The braking unit according to claim 8, wherein said power semiconductor switch is a bipolar transistor having an insulated gate electrode (insulated-gate bipolar transistor, IGBT).

10. The braking unit according to claim 6, wherein said energy-consuming switching unit comprises an ohmic resistor connected in parallel with said storage capacitor by way of a power semiconductor switching element.

11. The braking unit according to claim 10, wherein said power semiconductor switching element is a bipolar transistor having an insulated gate electrode (IGBT).

12. The braking unit according to claim 6, wherein said energy-consuming switching unit is a non-linear resistor connected directly in parallel with said storage capacitor.

13. The braking unit according to claim 12, wherein said non-linear resistor is an overvoltage arrestor.

* * * * *